United States Patent

Stayner et al.

[15] 3,648,013

[45] Mar. 7, 1972

[54] ELECTRICAL DISCHARGE MACHINING PROCESS AND DIELECTRIC FLUID USEFUL THEREIN

[72] Inventors: Robert A. Stayner, Palos Verdes Estates; George B. DeMay, El Segundo, both of Calif.

[73] Assignee: Chevron Research Company, San Francisco, Calif.

[22] Filed: Nov. 23, 1970

[21] Appl. No.: 92,183

[52] U.S. Cl. ...............................219/69 D, 44/68, 252/63.5, 252/63.7
[51] Int. Cl. .......................................B23k 9/00, H01b 3/22
[58] Field of Search..............44/68, 76; 219/68, 69 D, 69 M; 252/36, 63.5, 63.7, 386; 260/438.5 R, 481 R

[56] References Cited

UNITED STATES PATENTS 2,028,091  1/1936  Jaeger....................................260/481
3,012,969  12/1961  Van der Minne et al. ..............252/153
3,164,620  1/1965  Van der Minne et al. ..........260/438.5
3,397,971  8/1968  Van der Minne et al. ..................44/68

OTHER PUBLICATIONS

Klinkenberg et al., Electrostatics in the Petroleum Industry: The Prevention of Explosion Hazards, Elsevier Pub. Co., 1958, pp. 7, 28–29, 80–81.
Bonales, " The Spark That Carves" Product Engineering, Sept. 27, 1965, pp. 53–57.

*Primary Examiner*—John T. Goolkasian
*Assistant Examiner*—Robert A. Dawson
*Attorney*—A. L. Snow, F. E. Johnston, B. I. Rowland, G. F. Magdeburger and J. W. McClain

[57] ABSTRACT

An electrical discharge machining process using as a dielectric fluid a composition comprising a base oil and a minor amount of a conductivity additive containing a chromium salt of an alkyl salicylic acid and an alkaline earth metal salt of a dialkyl sulfosuccinate.

18 Claims, No Drawings

3,648,013

ELECTRICAL DISCHARGE MACHINING PROCESS AND DIELECTRIC FLUID USEFUL THEREIN

BACKGROUND OF THE INVENTION

1. Field of the Invention

This invention concerns electrical discharge machining processes and the dielectric fluids used therein.

Electrical discharge machining (EDM) is a method for drilling, cutting, or shaping electrically conductive stock by means of the controlled removal of material from the surface through melting or vaporization by high-frequency electrical sparks. The spark discharge is produced by controlled pulsing of direct current between the workpiece and the tool or electrode. The end of the electrode and the workpiece are separated by a narrow spark gap and are flooded by a dielectric fluid. The dielectric fluid in the gap is partially ionized under the pulsed application of a high voltage, thus enabling a spark discharge to pass between the tool and the workpiece. Each spark produces enough heat to melt or vaporize a small quantity of the workpiece leaving a tiny pit or crater in the surface of the work.

EDM is often used where the work material is of high hardness, high tensile strength, or poor machinability and the product to be formed is of complex or irregular shape or fragile structure.

The dielectric fluid serves as a spark conductor and coolant and as a flushing medium for removal of the small particles of material separated from the workpiece. Dielectric fluids have generally been selected for their high dielectric strength; i.e., low conductivity.

2. Description of the Prior Art

Electrical discharge machining processes and EDM fluids are described in the *Metals Handbook*, Vol. 3 (8th Ed.; American Society for Metals, Metals Park, Ohio: 1967). EDM is also the subject of an article by Bonales in *Products Engineering*, p. 53 (Sept. 27, 1965).

Compositions with formulations similar to those of the dielectric fluid described herein are disclosed in a text by Klinkenberg and van der Minne, *Electrostatics in the Petroleum Industry: The Prevention of Explosion Hazards* (Elsevier Publ. Co.: 1958). This text discusses the prevention of spark-caused explosions in petroleum distillates such as gasoline and kerosene. It teaches that explosion hazard can be reduced by using additives in small concentrations in the distillates to dissipate static electricity charges. These additives are divalent or polyvalent metal salts of carboxylic and sulfonic acids, both alone and in combination. Among the "antistatic" additives shown is a mixture of the chromium salt of a salicylic acid alkylated with one or two $C_{14}$–$C_{18}$ alkyl radicals and the calcium salt of di(2-ethylhexyl) sulfosuccinate. These materials are also disclosed in U.S. Pat. Nos. 2,028,091; 3,012,969; 3,164,620, and 3,397,971.

SUMMARY OF THE INVENTION

We have now discovered an improvement in electrical discharge machining processes which permits an increase in the work rate with minimum wear on the electrode. This improvement comprises using as a dielectric fluid in an electrical discharge machining process a composition comprising a major portion of a hydrocarbon, oxygenated hydrocarbon, or silicone base oil of defined properties, and 0.003 to 2.5 weight percent of a conductivity additive having 1 to 10 parts by weight each of (1) a chromium salt component and (2) an alkaline earth metal salt component. The chromium salt component is composed of at least one chromium salt of an alkyl salicylic acid containing one or two alkyl substituents, each having eight to 22 carbon atoms; the alkaline earth metal salt component is composed of at least one alkaline earth metal salt of a di($C_4$–$C_{14}$ alkyl)sulfosuccinate. This dielectric, or "EDM," fluid will have a conductivity of from 0.1–40 nanomho/cm.

DETAILED DESCRIPTION OF THE INVENTION

This invention concerns an improvement in electrical discharge machining processes and the dielectric fluid used therein. This improvement permits increases in the work rate and production output of electrical discharge machines by an average of up to 30 percent or more over the rate obtainable in present processes using commercial EDM fluids. This significant improvement in production rate is accompanied by a decrease in the wear rate of the tool or electrode.

The improvement in EDM processing claimed herein comprises the use of the EDM fluid defined below. This fluid is a clear, bright liquid through which the work can readily be observed. It has essentially no disagreeable odor and presents no dermatological hazard to machine operators who come in contact with it.

Three of the principal properties of the EDM fluid used in this process are conductivity, solvency of the base oil, and viscosity. Conductivity will be in the range of from 0.1–40 nanomho/cm., usually 0.3–20 nanomho/cm., and more preferably, 0.5–5 nanomho/cm. Measurement of conductivity is described in the text by Klinkenberg and van der Minne supra. A fluid conductivity outside this range will not permit a proper flow of sparks across the spark gap. A higher conductivity permits DC arcing to occur due to the inability of the fluid to deionize rapidly between pulses of current. A lower conductivity requires too high a voltage before the fluid ionizes and sparking occurs. The resulting high-intensity spark then vaporizes so much material from a localized area on the workpiece that the finished surface becomes rough and pitted. The fluid defined herein, however, permits the improved process to produce precise cutting and shaping, while at the same time, leaving the workpiece with an extremely fine and smooth finish.

The base oil will have a solvency defined by a Mixed Aniline Point (ASTM D-611) in the range of 120° to 160° F., usually 140°–160° F.

The fluid will also have an ASTM D-2161 viscosity in the range of 30 to 40 SUS, preferably 32 to 35 SUS, at 100° F. Fluids of lower viscosity have unacceptably low flashpoints and thus pose safety problems. Higher viscosity fluids are too viscous to flow properly through the narrow spark gap and remove the detritus.

In addition to conductivity, solvency, and viscosity as defined above, the EDM fluids used in the improved process of this invention will have a minimum ASTM D-93 flashpoint of 140° F., usually 155° F. They will have an ASTM D-86 initial boiling point of at least 370° F., usually at least 390° F. The end point of the boiling range will be determined by the viscosity properties. Typically, the end point will be 650°–750° F. or greater. The fluid as compounded will contain no substantial amounts of metals other than chromium and alkaline earth metals. (It will, of course, pick up metal fragments from the workpiece in use.)

This invention is an improvement in the process of electrical discharge machining which comprises using as the dielectric fluid a composition composed of a major portion of a hydrocarbon, oxygenated hydrocarbon, or silicone base oil, or mixtures thereof, having a viscosity at 100° F. of 30 to 40 SUS, a flashpoint of at least 140° F., an initial boiling point of at least 370° F., and a Mixed Aniline Point of 120° to 160° F., and from about 0.003 to about 2.5 weight percent of a conductivity additive composed of 1 to 10 parts by weight each of (1) a chromium salt component and (2) an alkaline earth metal salt component, wherein the chromium salt component is composed of at least one chromium salt of an alkyl salicylic acid containing one or two alkyl substituents having eight to 22 carbon atoms, and the alkaline earth metal salt component is composed of at least one alkaline earth metal salt of a di($C_4$–$C_{14}$ alkyl)sulfosuccinate, providing the fluid with a conductivity in the range of 0.1–40 nanomho/cm.

The conductivity additive will be present as 0.003 to 2.5, usually 0.01 to 1.2, and more preferably 0.02 to 0.25 percent by weight, of the composition. The conductivity additive is composed of a mixture of 1 to 10, usually 2 to 5, parts by weight each (based on additive) of (1) a chromium salt component and (2) an alkaline earth metal salt component, wherein the chromium salt component is composed of at least one chromium salt of an alkyl salicylic acid containing one or two alkyl substituents having eight to 22 carbon atoms, and the alkaline earth metal salt component is composed of at least one alkaline earth metal salt of a di($C_4$–$C_{14}$ alkyl)sulfosuccinate.

The chromium salt component is a compound or mixture of compounds of the formula:

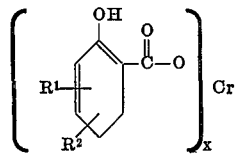

wherein $R^1$ is an alkyl radical of from eight to 22, usually 12 to 20 or 14 to 18, carbon atoms; $R^2$ is hydrogen or an alkyl radical of from 8 to 22, usually 12 to 20 or 14 to 18, carbon atoms; and $x$ is equal to the valence of chromium. The alkyl radicals may be straight or branched chain. This component is usually a mixture of compounds, composed of both mono- and dialkyl salts, as well as mixtures of alkyl chain lengths.

The alkaline earth metal salt component is composed of one or more compounds of the formula:

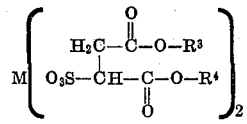

wherein $R^3$ and $R^4$ may be the same or different and are alkyl radicals containing from four to 14, usually from eight to 12, carbon atoms, and M is an alkaline earth metal. The alkaline earth metals commonly used are magnesium, calcium strontium, and barium. Of these, the most preferred is calcium. As with the chromium salt above, the "alkaline earth metal salt" may in fact be a mixture of salts. The mixture may contain salts of two or more alkaline earth metals, or, more usually, two or more alkyl derivatives.

The principal portion of the EDM fluid used in this invention is a "base fluid" selected from the group consisting of hydrocarbon oils, oxygenated hydrocarbon oils, and silicone fluids. The base oil will be present as the remainder of the EDM fluid after the conductivity additive and any other additives are accounted for. It will comprise at least 90 weight percent, and will usually be 96.5 to 99.0 weight percent, of the EDM fluid composition.

The base oil will be a hydrocarbon oil, oxygenated hydrocarbon oil, of a silicone oil. The base oil may consist of a single compound having the requisite physical properties. Usually, however, the base oil will consist of a mixture of compounds, selected such that the mixture has the requisite properties. These compounds may be all of one type e.g., all hydrocarbons) or the mixture may contain (e.g., oxygenated hydrocarbons, and silicones in varying amounts. The particular compounds must, of course, all be miscible with each other or capable of being made miscible by mutual solvents. They must also be essentially inert in the EDM environment; i.e., substantially unaffected during a normal service lifespan by the presence of oxygen or air, heat, metal, and high-intensity sparks. The hydrocarbons, oxygenated hydrocarbons and mixtures thereof are preferred because the vapors of the silicone fluids pose a health hazard to operators unless operational precautions are taken. Solubility of the conductivity additive in the silicone fluids is significantly lower than in the other fluids and a dispersant is generally required for incorporation of the proper amount of additive.

"Hydrocarbon oils," as used herein, refers to those hydrocarbon compounds which have the requisite initial physical properties. Usually such hydrocarbons will be aliphatic or alicyclic materials, substantially saturated; i.e., having little or usually no aromatic or aliphatic unsaturation. Typical examples are paraffinic and naphthenic oils such as kerosene, heavy gasoline, light oils, and the like.

The "oxygenated hydrocarbons" suitable for use in the process of this invention must be polar, oil soluble, and will contain only carbon, hydrogen, and oxygen; they are usually esters, ethers, lactones, or alcohols. Preferred are the esters, particularly the alkyl esters of monocyclic aromatic carboxylic acids. The alkyl groups will usually each have one–20 carbon atoms, preferably five–15 carbon atoms. The preferred monocyclic aromatic carboxylic acids are the dicarboxylic acids having zero–two noncarboxylate substituents, of one–four carbon atoms each, on the benzene ring. Typical examples of suitable oxygenated hydrocarbon oils are dioctyl phthalate, didecyl phthalate, octyl dodecyl phthalate, and the like.

It is preferred, as noted above, that the base fluid be a mixture of hydrocarbon and oxygenated hydrocarbon oils. Typical of these fluids is a mixture of kerosene and dioctyl phthalate, in a volumetric ratio of 60–95 parts kerosene to 40–5 parts dioctyl phthalate.

The conductivity additive will have no substantial effect on any physical properties of the EDM fluid, except, of course, the conductivity. Thus the other physical properties defined herein may be considered to be those of either the fluid or the base oil. In some cases it is more practical to measure the property on the base fluid, to avoid complications by side reactions of the additive in the test e.g., reactions of the additive and aniline in the Mixed Aniline Point test).

The base oil will have an ASTM D–86 initial boiling point of at least 370° F., preferably at least 390° F. This value is related to the minimum flashpoint of the base oil which will be at least 140° F., and preferably at least 155° F. The volatile light materials, such as light hydrocarbons, ethers, etc., which produce an unacceptable safety hazard in the presence of the electrical sparks are thus excluded from the EDM fluid. There is no specific upper limit on the D–86 distillation range of the base oil; the end point will instead be defined in terms of the viscosity range of the fluid. The base oil cannot contain highboiling contents which will impart to the oil a viscosity at 100° F. greater than 40 SSU. The distillation end point will thus be dependent on the particular mixture of components in the base oil and will generally be in the range of about 650°–750° F. or greater. The base oil will have a conductivity of not more than 0.01 nanomho/cm., and usually only about 0.005–0.008 nanomho/cm.

The base oil should be substantially transparent to allow inspection of the workpiece during the process. The base oil itself may have a light color and the additives described below which may be present may impart some color to the oil. This color should not be so dark, however, that the transparency is significantly impaired.

If desired, additives other than the conductivity additive may also be present in the EDM fluid. These will include such materials as antioxidants, dispersants, and odor-masking agents. The total concentration of these additives will not exceed 9.97 weight percent, and preferably not more than 2.0 weight percent of the total EDM fluid.

The following examples will serve to illustrate the present invention. All parts specified are by weight.

An EDM fluid was prepared by combining 9,995 parts of a base oil, 1.6 parts of a conductivity additive, and 10 parts of a commercial masking agent. The base oil consisted of a mixture of kerosene and dioctyl phthalate in a weight ratio of 9:1, and had a conductivity of 0.006 nanomho/cm. The conductivity additive consisted of equal parts of a chromium salt of a dialkyl salicylic acid derived from phenol alkylated with a mixture of $C_{14}$–$C_{18}$ alkyl groups, and calcium didecyl sulfosuccinate. This EDM fluid had a viscosity at 100° F. of 33 SSU, a flash point of 180° F., a base oil Mixed Aniline Point of about 142° F., a distillation range of from 390°–650° F., and a conductivity of 1.5 nanomho/cm. (The fluid also contained less than one part of a polymeric material present with the conductivity additive as obtained commercially; this material does not have a significant effect on the properties of the fluid.)

This fluid was used in a series of experiments in a conventional EDM machine. Duplicate runs were made using this fluid in one run and a commercial EDM fluid in the comparison run. The commercial fluid was a typical representative of the prior art fluids, having a high dielectric strength (45 kv.) and a resultant low conductivity (about 0.001 nanomho/cm.). The tests were designed to compare machining rate and tool wear under specified operating conditions to give rough finish and fine finish on the surface of the workpiece. Three different combinations of electrode materials and work materials were selected to give widely different wear ratios and metal removal rates. The test results are summarized in the table below where two frequencies are listed; the lower frequency represents rough finishing and the higher frequency represents fine finishing of the workpiece.

TABLE

| Materials | Frequency, kHz. | Increase in Stock Removal Rate by Improved Process, % |
|---|---|---|
| Tungsten copper electrodes eroded into tungsten carbide | 12 | 25 |
| Copper electrode eroded into steel carbide electrode | 3 | 11 |
|  | 37 | 25 |
| Graphite eroded into steel | 3 | 15 |
|  | 37 | 50 |

It is apparent from these data that at both high and low frequencies, i.e., rough and fine finishing, the process of this invention utilizing the EDM fluid described above permits a substantial increase in the production rate of electrical discharge machines. At the same time it was observed in these tests that the wear rate of the electrodes was substantially reduced.

The above example and data are intended to be illustrative only and are not to be considered limiting. It will be apparent to those skilled in the art that there are numerous embodiments within the scope and spirit of this invention.

We claim:

1. In a process for electrical discharge machining which comprises passing a spark generated by pulsed application of an electrode at high voltage to a workpiece through a spark gap flooded by a dielectric fluid, the improvement which comprises employing as said dielectric fluid a composition comprising a major portion of an inert base fluid selected from the group consisting of hydrocarbon, oxygenated hydrocarbon and silicone oils and mixtures thereof; and 0.003 to 2.5 weight percent of a conductivity additive comprising 1–10 parts by weight each of (1) a chromium salt component and (2) an alkaline earth metal component, said chromium salt component comprising at least one chromium salt of an alkyl salicylic acid containing one or two alkyl substituents, each having eight–22 carbon atoms, and said alkaline earth metal salt component comprising at least one alkaline earth metal salt of a di($C_4$–$C_{14}$ alkyl) sulfosuccinate; said composition having a conductivity of from 0.1–40 nanomho/cm., a base oil Mixed Aniline Point of 120°–160° F., and a kinematic viscosity of 30–40 SUS at 100° F.

2. The process of claim 1 wherein said composition contains 0.01–1.2 percent by weight of said conductivity additive.

3. The process of claim 2 wherein said conductivity additive consists of a mixture of 2–5 parts by weight each of said chromium salt component and said alkaline earth metal salt component.

4. The process of claim 2 wherein said composition contains 0.02–0.25 percent by weight of said conductivity additive.

5. The process of claim 1 wherein said base oil is selected from the group consisting of substantially saturated aliphatic or alicyclic hydrocarbon compounds, esters, or mixtures thereof.

6. The process of claim 5 wherein said esters are alkyl esters of monocyclic aromatic carboxylic acids.

7. The process of claim 6 wherein said base oil is a mixture of kerosene and at least one $C_5$–$C_{15}$ alkyl ester of a monocyclic aromatic dicarboxylic acid having zero–two noncarboxylate substituents of one–four carbon atoms each on the benzene ring.

8. The process of claim 7 wherein said ester is dioctyl phthalate.

9. The process of claim 5 wherein said conductivity additive consists essentially of 2–5 parts each by weight of (1) a mixture of chromium salts of mono- and dialkyl salicylic acids with each alkyl substituent containing 12–20 carbon atoms; and (2) a calcium di($C_8$–$C_{12}$ alkyl) sulfosuccinate.

10. The process of claim 9 wherein said composition contains 0.01–1.2 percent by weight of said conductivity additive.

11. The process of claim 10 wherein said composition contains 0.02–0.25 percent by weight of said conductivity additive.

12. A composition useful as an electrical discharge machining fluid which consists essentially of 90–99 parts by weight of a base fluid consisting of a mixture of kerosene and dioctyl phthalate in a volumetric ratio of 60–95 parts of kerosene to 40–5 parts of dioctyl phthalate, and 0.003–2.5 parts by weight of a conductivity additive consisting of a mixture of a chromium salt component and an alkaline earth metal salt component, wherein each of said components is present as 1–10 parts by weight of said additive, and wherein said chromium salt component comprises at least one chromium salt of an alkyl salicylic acid containing one or two alkyl substituents each of from eight–22 carbon atoms, and said alkaline earth metal salt component comprises at least one alkaline earth metal salt of a di($C_4$–$C_{14}$ alkyl) sulfosuccinate.

13. The composition of claim 12 wherein said chromium salt compontne comprises at least one chromium salt of an alkyl salicylic acid containing one or two alkyl substituents of from 12–20 carbon atoms.

14. The composition of claim 13 wherein said alkyl substituents are of from 14–18 carbon atoms.

15. The composition of claim 12 wherein said alkaline earth metal salt component comprises a calcium salt of a di($C_4$–$C_{14}$ alkyl) sulfosuccinate.

16. The composition of claim 15 wherein said calcium salt is a calcium salt of a di($C_8$–$C_{12}$ alkyl) sulfosuccinate.

17. The composition of claim 16 wherein said calcium salt is calcium didecyl sulfosuccinate.

18. The composition of claim 12 wherein said base oil consists of 80–95 parts by volume of kerosene and 20–5 parts by volume of dioctyl phthalate.

* * * * *